US008904529B2

United States Patent
Ward

(10) Patent No.: US 8,904,529 B2
(45) Date of Patent: Dec. 2, 2014

(54) AUTOMATED DEPLOYMENT OF PROTECTION AGENTS TO DEVICES CONNECTED TO A COMPUTER NETWORK

(75) Inventor: Matthew Ward, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1775 days.

(21) Appl. No.: 11/517,165

(22) Filed: Sep. 7, 2006

(65) Prior Publication Data

US 2007/0056020 A1 Mar. 8, 2007

Related U.S. Application Data

(60) Provisional application No. 60/714,605, filed on Sep. 7, 2005.

(51) Int. Cl.
 *H04L 29/06* (2006.01)
(52) U.S. Cl.
 CPC ......... *H04L 63/1408* (2013.01); *H04L 63/0272* (2013.01)
 USPC .......................................................... 726/23
(58) Field of Classification Search
 CPC .. H04L 63/20; H04L 63/0272; H04L 63/1408
 USPC ........................................................ 726/3, 23
 See application file for complete search history.

(56) References Cited

U.S. PATENT DOCUMENTS

| | | | |
|---|---|---|---|
| 5,919,258 A | 7/1999 | Kayashima et al. | |
| 6,701,440 B1 | 3/2004 | Kim et al. | |
| 6,981,146 B1 * | 12/2005 | Sheymov | 713/172 |
| 7,010,807 B1 | 3/2006 | Yanovsky | |
| 7,047,562 B2 * | 5/2006 | Peterson et al. | 726/14 |
| 7,058,822 B2 | 6/2006 | Edery et al. | |
| 7,269,851 B2 | 9/2007 | Ackroyd | |
| 7,506,166 B2 * | 3/2009 | Sheymov | 713/172 |

(Continued)

FOREIGN PATENT DOCUMENTS

| | | |
|---|---|---|
| CN | 1601974 A | 3/2005 |
| JP | 2004246444 A | 9/2004 |

(Continued)

OTHER PUBLICATIONS

Mukherjee et al.; Network intrusion detection; Published in: Network, IEEE (vol. 8 , Issue: 3 ); Date of Publication: May-Jun. 1994; pp. 26-41; IEEE Xplore.*

(Continued)

*Primary Examiner* — Bradley Holder
(74) *Attorney, Agent, or Firm* — King & Spalding

(57) ABSTRACT

Network traffic is monitored to detect attempted inter-network communications, including attempts by devices internal to the network to communicate with resources external to the network and attempts by devices external to the network to establish VPN sessions with resources internal to the network. Upon detecting an attempted inter-network communication, the device responsible for initiating such communication is identified. Then, it is determined whether the identified device is running a valid protection agent. If so, the attempted inter-network communication is permitted. If not, the attempted inter-network communication is blocked in compliance with a network security policy and the identified device is prompted to download and install a protection agent from a designated storage location, or to activate a previously installed protection device. The prompt may include a hyperlink for initiating download of the protection agent.

10 Claims, 2 Drawing Sheets

(56) References Cited

U.S. PATENT DOCUMENTS

| | | | |
|---|---|---|---|
| 7,509,642 B1* | 3/2009 | Mitchell et al. | 718/101 |
| 7,614,083 B2* | 11/2009 | Khuti et al. | 726/22 |
| 7,761,923 B2* | 7/2010 | Khuti et al. | 726/27 |
| 2001/0039579 A1* | 11/2001 | Trcka et al. | 709/224 |
| 2002/0078209 A1* | 6/2002 | Peng | 709/227 |
| 2002/0095607 A1* | 7/2002 | Lin-Hendel | 713/201 |
| 2002/0103779 A1* | 8/2002 | Ricart et al. | 707/1 |
| 2002/0116615 A1* | 8/2002 | Nguyen et al. | 713/168 |
| 2003/0033419 A1 | 2/2003 | Zou et al. | |
| 2003/0055962 A1* | 3/2003 | Freund et al. | 709/225 |
| 2003/0083847 A1* | 5/2003 | Schertz et al. | 702/186 |
| 2003/0084320 A1* | 5/2003 | Tarquini et al. | 713/200 |
| 2003/0084329 A1* | 5/2003 | Tarquini | 713/201 |
| 2003/0097557 A1* | 5/2003 | Tarquini et al. | 713/153 |
| 2004/0022033 A1* | 2/2004 | Hsu | 361/726 |
| 2004/0098623 A1* | 5/2004 | Scheidell | 713/201 |
| 2004/0103317 A1 | 5/2004 | Burns | |
| 2004/0107360 A1* | 6/2004 | Herrmann et al. | 713/201 |
| 2004/0158738 A1 | 8/2004 | Tanaka | |
| 2004/0167984 A1* | 8/2004 | Herrmann | 709/229 |
| 2004/0250114 A1* | 12/2004 | Parekh et al. | 713/201 |
| 2004/0255153 A1* | 12/2004 | Huynh et al. | 713/201 |
| 2005/0050334 A1 | 3/2005 | Liang et al. | |
| 2005/0076227 A1* | 4/2005 | Kang et al. | 713/188 |
| 2005/0125526 A1 | 6/2005 | Chou | |
| 2005/0172155 A1* | 8/2005 | Sheymov | 713/201 |
| 2005/0177868 A1 | 8/2005 | Kwan | |
| 2005/0228695 A1* | 10/2005 | Ito | 705/2 |
| 2006/0053491 A1* | 3/2006 | Khuti et al. | 726/23 |
| 2006/0075467 A1* | 4/2006 | Sanda et al. | 726/1 |
| 2006/0095965 A1* | 5/2006 | Phillips et al. | 726/22 |
| 2006/0294579 A1* | 12/2006 | Khuti et al. | 726/3 |
| 2007/0044153 A1 | 2/2007 | Schuba et al. | |
| 2007/0101405 A1* | 5/2007 | Engle et al. | 726/4 |

FOREIGN PATENT DOCUMENTS

| | | |
|---|---|---|
| JP | 2004361996 A | 12/2004 |
| JP | 2005157968 A | 6/2005 |
| JP | 2005197815 A | 7/2005 |
| JP | 2006252256 A | 9/2006 |
| WO | 2004097584 A2 | 11/2004 |

OTHER PUBLICATIONS

Huang et al.; A cooperative intrusion detection system for ad hoc networks; Published in: Proceeding SASN '03 Proceedings of the 1st ACM workshop on Security of ad hoc and sensor networks; 2003; pp. 135-147; ACM Digital Library.*

International Search Report, PCT/US2006/034665, Sep. 26, 2007, pp. 1-2.

Ryosuke Sato, et al., "A Study on a Dynamic Reconfiguration System to Keep a Network in a Secure Condition", Report of Information Processing Society of Japan, vol. 2002 No. 12, Information Processing Society of Japan, Feb. 15, 2002, p. 169-174 *T5- English abstract only.

Extended Search Report dated Jan. 19, 2012 for PCT/US2006034665, 7 pages.

* cited by examiner

AUTOMATED DEPLOYMENT OF PROTECTION AGENTS TO DEVICES CONNECTED TO A COMPUTER NETWORK

RELATED APPLICATIONS

The present application claims the benefit of U.S. Provisional Patent Application No. 60/714,605, entitled "Systems and Methods for Downloading Protection Agents in a Distributed Computer Network," which was filed on Sep. 7, 2005 and which is incorporated herein by reference in its entirety.

TECHNICAL FIELD

The present invention relates generally to computer network security. More specifically, the present invention relates to the deployment of protection agents to workstations, clients, servers and other devices connected to a distributed computer network.

BACKGROUND OF THE INVENTION

Private computer networks are often interconnected to other networks, such as the Internet, and are therefore susceptible to intrusion. For this reason, many private networks are protected by some type of intrusion prevention system. An intrusion prevention system can be generally described as hardware and/or software for exercising access control to protect computers and other network resources from exploitation. There are several different types of intrusion prevention systems, including network intrusion prevention systems ("network IPS") and host-based intrusion prevention systems ("host-based IPS").

Network IPS are typically hardware and software platforms designed to analyze, detect and report on security related events. Network IPS inspect traffic and, based on their configuration or security policy, can drop malicious traffic. Network IPS are designed sit inline with network traffic flows and prevent attacks in real-time. In addition, most network IPS have the ability to decode certain communication protocols like HTTP, FTP, and SMTP, which provides greater awareness. Some network IPS, such as the Proventia® Network Multi-Function Security (also referred to as "Proventia® M") by Internet Security Systems, Inc. of Atlanta Ga. ("ISS"), perform multiple network security functions, including firewall, VPN, anti-virus, Web filtering and anti-spam protection.

Host-based IPS run on a host, such as a client, workstation, server or other device, where packets have been decrypted and file-access and registry-access can be monitored granularly and accurately. As an example, Proventia® Desktop Endpoint Security by ISS is a host-based IPS that is designed to preemptively protect desktop workstations against viruses, worms and improper activity, while keeping operations running and enforcing system compliance. As another example, Proventia® Server Intrusion Prevention System by ISS is a host-based IPS that is designed to proactively stop threats which could compromise valuable and critical applications and assets residing on a network server. Host-based IPS are sometimes referred to as "desktop agents" or "protection agents" because they may be deployed to various network devices and controlled from a centralized management console. In some cases, a network-IPS may also function as a management console for protection agents deployed to devices within the same network.

Devices connected to a private network may be internal to the network (i.e., behind the network firewall) or external to the network (i.e., beyond the network firewall, but in communication with an internal network resource by way of a virtual private network session, etc.) In an optimal scenario, a protection agent will be deployed to each device connected to a private network. In this way, each device connected to the private network will be individually protected against unauthorized network communications, such as intrusions and virus infections. However, the configuration of a distributed computer network can change rapidly over time as servers, workstations, clients and other devices and resources are added, replaced, relocated and repurposed. Therefore, ensuring that protection agents are deployed to all relevant network devices can be cumbersome and time-consuming for a network administrator. Accordingly, there is a need in the art for an efficient and automated method for deploying protection agents to devices connected to a distributed computer network.

SUMMARY OF THE INVENTION

The present invention satisfies the above-described need by providing systems and methods for automating the deployment of protection agents to devices connected to a distributed network. Generally described, the present invention involves monitoring network traffic and detecting attempted inter-network communications. Attempted inter-network communications can include attempts by devices internal to the distributed network to communicate with resources external to the distributed network and attempts by devices external to the distributed network to establish virtual private network sessions with resources internal to the distributed network. Attempts by devices internal to the distributed network to communicate with resources external to the distributed network can be detected by identifying network traffic employing HTTP or HTTPS protocols or network traffic on one or more of port 80 and port 443.

In response to detecting an attempted inter-network communication, the device responsible for initiating such communication is identified. Then, a determination is made as to whether the identified device is running a valid protection agent. If so, the attempted inter-network communication is permitted. If not, the attempted inter-network communication is blocked and the identified device is prompted to download and install a protection agent from a designated storage location, or to activate a previously installed protection device.

Registration information generated by protection agents running on devices connected to the distributed network may be collected and stored. Determining that the identified device is not running a valid protection agent may involve determining that none of the stored registration information corresponds to the identified device. Determining that the identified device is not running a valid protection agent may also involve determining that none of the registration information stored in within a specified time interval corresponds to the identified device. Prompting the identified device to download and install a protection agent may involve providing a hyperlink that, when activated, will initiate the download of the protection agent from the designated storage location, which may be an intrusion prevention system, a network server, or the like.

These and other aspects, features and embodiments of the present invention will become apparent to those skilled in the art upon consideration of the following detailed description of illustrated embodiments exemplifying the best mode for carrying out the invention as presently perceived.

DETAILED DESCRIPTION OF EXEMPLARY EMBODIMENTS OF THE INVENTION

Figure 1:
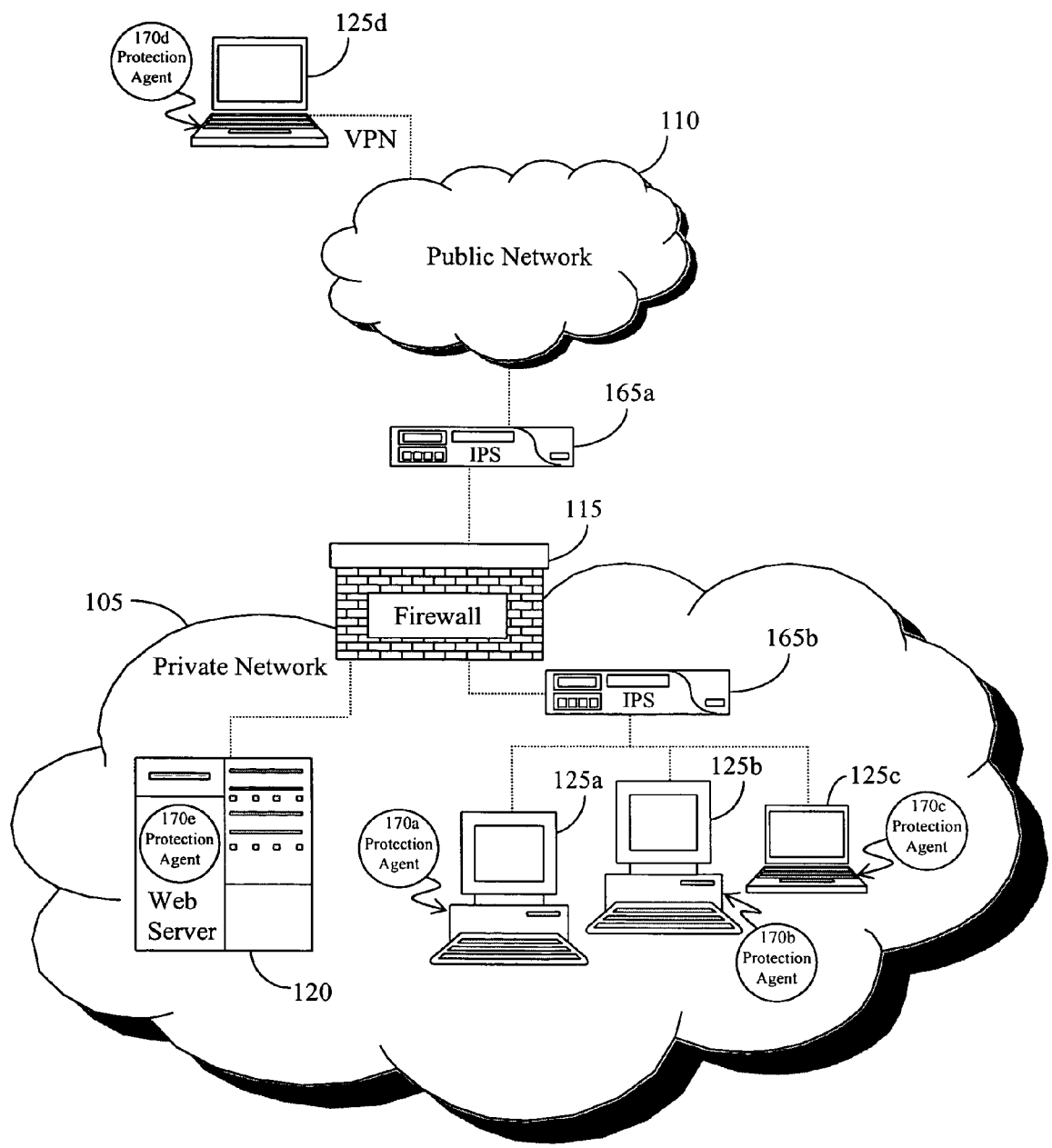
FIG. 1 is a block diagram illustrating a suitable computer network environment 100 for implementing certain exemplary embodiments of the present invention.

The present invention provides systems and methods for deploying protection agents to devices connected to a distributed computer network. The following description of exemplary embodiments of the invention will refer to the attached drawings, in which like numerals indicate like elements throughout the several figures. FIG. 1 is a block diagram illustrating a suitable computer network environment 100 for implementing exemplary embodiments of the present invention. The exemplary computer network environment 100 includes at least two distributed networks, including a private network 105 and a public network 110. The private network 105 may be a local area network ("LAN"), a wide area network ("WAN"), a combination thereof, or any other intranet configuration. The public network 110 may be the Internet or any other publicly accessible computer network.

A private network 105 may include one or more endpoint devices, such as servers 120, clients 125 and other computer or electronic devices. Such devices may be connected to the private network 105 through a network interface card, modem or other suitable means for establishing and receiving network communications. A client 125 may be a desktop computer 125a, a laptop computer 125b, a handheld computer 125c and the like. Remote clients 125d and other devices (e.g., mobile phones) may communicate with the private network 105 via a virtual private network "(VPN") 165 or other suitable secure communication protocols. As is well known in the art, a VPN 165 can be established using one or more of a variety of security measures to provide secure access to a private network 105 via a public network 110.

As is also well known in the art, a device capable of connecting to a network (e.g., a client 125, a server 120, etc.) generally includes a processor for executing computer-executable instructions, a system memory (i.e., a suitable storage medium) for storing program modules and data and a system bus that couples the system memory to the processing unit. System memory typically includes read only memory ("ROM") and/or random access memory ("RAM"). A network device may also include a hard disk drive, a magnetic disk drive (i.e., for reading from and writing to a magnetic disk), and/or an optical disk drive (i.e., for reading from or writing to optical media, such as a CD or DVD), each of which may be connected to the system bus via an appropriate interface. Such drives and their associated computer-readable media provide nonvolatile storage for the computer system. Those skilled in the art will appreciate that other types of media readable by a computer system include magnetic cassettes, flash memory cards, zip drives, Bernoulli cartridges, and the like.

A number of program modules may be stored in the nonvolatile storage (e.g., hard disk), the system memory (e.g., RAM) and/or other computer-readable media of a network device. Typical program modules installed on and executed by a network device include a basic input/output system ("BIOS"), an operating system and one or more application program. As used herein, the term "program module" is also intended to encompass components of an application program, such as executable files, DLLs, etc., and any other computer-executable instructions that cause a processor to perform desired functions. Certain embodiments of the present invention may be implemented through one or more intrusion prevention system program modules and/or protection agent program modules that include computer-executable instructions for performing the various methods described herein.

A typical private network 105 is guarded by a firewall 115 at a gateway connection to a public network 110 or other external network. As is well known in the art, a firewall 115 is hardware and/or software for preventing communications forbidden by a security policy. Many private networks 105 are also protected by some type of intrusion prevention system 165. Like a firewall 115, an intrusion prevention system 165 is hardware and/or software for exercising access control to protect computers from exploitation. However, whereas firewalls 115 typically make access control decisions based on IP addresses or ports, intrusion prevention systems 165 make access control decisions based on application content.

In some cases, IPS functionality and firewall functionality may be combined into a single device or set of devices. Accordingly, as used herein, the term "intrusion prevention system" (or "IPS") is meant to broadly refer to any hardware and/or software platform that performs or manages network IPS functionality and/or firewall functionality, including any associated management consoles. As is well known in the art, network IPS functionality includes the inspection and analysis of network traffic flows and the ability to detect and drop malicious traffic based on a security policy. As shown in FIG. 1, an IPS 165 may be placed beyond a firewall 115 (i.e., between the public network 110 and the firewall 115) and/or behind a firewall 115. In accordance with the present invention, an IPS 165 is also configured to manage the deployment of protection agents 170 to the clients 125, servers 120 and other devices connected to the exemplary private network 105.

An IPS 165 can be configured to monitor and analyze network traffic (sometimes referred to as "message traffic") carried by a distributed computer network, such as the exemplary private network 105, to detect inter-network access activities being performed or requested in relation thereto. For example, an IPS 165 may be configured to monitor network traffic employing HTTP or HTTPS protocols, to thereby detect attempts by a client 125a-c or servers 120 internal to the private network 105 to access the public network 110 or other resources external to the private network 105. In addition, or in the alternative, an IPS 165 can be configured to detect attempts to access the public network 110 or other external resources by monitoring network traffic on ports 80 and 443 generated by devices internal to the private network 105. An IPS 165 may also have access to network configuration information identifying each client 125a-c, server 120 or other device connected to the private network 105. Accordingly, an IPS 165 is able to identify any particular device connected to the private network 105 that attempts to access the public network 110 or any other external network resource. In addition, an IPS 165 according to the present invention can be configured to drop all inter-network traffic to and from devices connected to the private network 105 that are not running a valid protection agent 170.

In certain embodiments, protection agents 170 are deployed to network devices using a "pull" model, which relies on the network devices to download protection agents 170 from the IPS 165, or another designated server, for installation onto the network devices. As an example, based on network configuration information, the IPS 165 can respond to a client's 125*a* attempted web browsing activity with a prompt to install and/or activate a protection agent 170*a*. If the protection agent 170*a* is not already installed on the client 125*a*, the user can respond to the prompt by initiating a download of the protection agent 170*a* for installation on and execution by the client 125*a*. In certain embodiments, the prompt issued by the IPS 165 may include a hyperlink that can be activated to initiate the download of the protection agent 170*a*.

The use of a hyperlink to facilitate a download of a program module is well-known in the art and, therefore, specific implementation details are not discussed herein. Those skilled in the art will appreciate that there are many other methods and programming techniques for facilitating downloads, any of which may be employed by the present invention. Also, in certain alternate embodiments, protection agents 170 can be deployed to network devices using a "push" model. In a "push" model an IPS 165, or another designated server, is configured to deliver (or cause to be delivered) protection agents 170 to devices that do not otherwise request such delivery.

Protection agents 170 may be configured to contact the IPS 165 (or another registration device) to complete a registration operation, once installed and activated on a client 125. The registration operation, in certain embodiments, may provide the IPS 165 with information that links the registering protection agent 170 with the identity of the device on which it is installed. In other words, the registration information comprises the identity of the protection agent 170 and the identity of the corresponding network device. The registration information can be stored in a database or in another suitable storage medium functionally coupled to or accessible by the IPS 165.

Protection agents 170 may be further configured to communicate registration information to the IPS 165 (or another designated registration device) on an on-going basis, as long as they are actively running. For example, the protection agents 170 may use a "heartbeat" or "polling" signal to forward registration information to the IPS 165 (or another registration device) at discrete intervals on a continuous basis. Alternatively, the protection agents 170 may forward registration information to the IPS 165 (or another registration device) at irregular, random or pseudo-random intervals. As another example, the IPS 165 (or other registration device) may be configured to query one or more network devices in order to request registration information from any protection agents 170 installed thereon.

When a network device attempts to access the Internet 110, or any other resource external to the private network 105, the IPS 165, which monitors network traffic and other operations and acts as an agent manager, determines whether the device is running a valid protection agent 170. Based on the identity of the network device, which may be determined by its network address, MAC address, or any other suitable unique identifier, the IPS 165 queries the stored registration information to determine whether a protection agent 170 has been previously registered in association with that device. In certain embodiments, the network device will be deemed to be not running a valid protection agent 170 if it is running a protection agent 170 that has not been registered within a preconfigured or configurable time interval.

If the IPS 165 determines that the network device is running a valid protection agent 170, the IPS 165 will allows the device to communicate with resources external to the private network 105. If, on the other hand, the network device is determined to not be running a valid protection agent 170, IPS 165 will take action to block some or all (depending on the security policy applied to the IPS 165) inter-network communications to and from that device. For example, it may be desirable in some cases to block all inter-network communications to and from the non-compliant device. In other cases, inter-network communications between the non-compliant device and certain trusted external resources may be permitted.

The user interface display at the network device can be used to advise the user of any blocked-access action taken by the IPS 165. For example, the IPS 165 may be configured to send prompt, in the form of a webpage or other suitable message, to a network device that is not running a valid protection agent, in response to the detection of attempted inter-network communications by that device. The prompt may advise the user that a previously installed protection agent 170 must be activated or that a protection agent 170 must be installed (e.g., by activating a hyperlink to initiate a download) and activated before communications with some or all resources external to the private network 105 will be permitted.

As is known in the art, an IPS 165 may also include functionality detecting attempts by external clients 125*d* and other external devices to access the resources of the private network 105 by way of a VPN session. In certain embodiments of the present invention, an IPS 165 may be configured to identify any external device attempting to establish a VPN session and deploy protection agents 170 to that device, if necessary. For example, IPS 165, acting as an agent manager, may query the stored registration information to determine whether an external client 125*d* attempting to establish a VPN session is associated with a previously registered protection agent 170*d* and, if so, whether that protection agent 170*d* was registered during a specified time interval. If the external client 125*d* is determined to be running a valid (e.g., timely registered) protection agent 170*d*, the IPS 165 allows the VPN session to continue. If, on the other hand, the external client 125*d* is deemed to not be running a valid protection agent 170*d*, the IPS 165 takes action to block the VPN session (or, depending on the applicable security policy, to confine it to certain activities) and may prompt the user of the external client 125*d* to install (e.g., by selecting a hyperlink to initiate a download) and/or activate a protection agent 170*d*.

Figure 2:
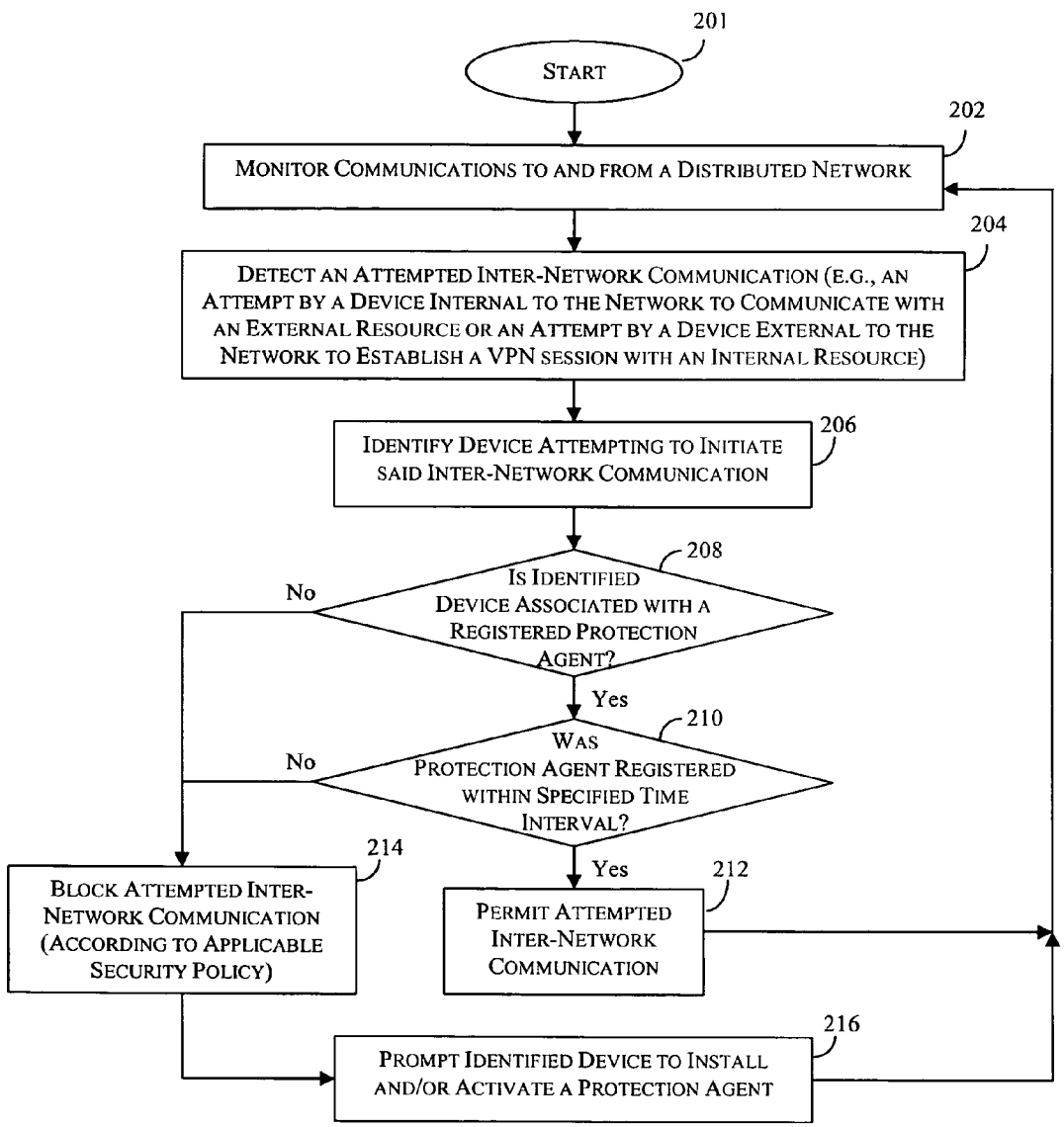
FIG. 2 is a process flow diagram illustrating an exemplary method for deploying protection agents to devices connected to a distributed computer network, in accordance with certain exemplary embodiments of the present invention.

FIG. 2 is a process flow diagram illustrating an exemplary method 200 for deploying protection agents 170 to devices connected to a distributed computer network. The exemplary method begins at starting block 201 and proceeds to step 202, where communications to and from the distributed network are monitored. Next at step 204, an attempted inter-network communication is detected. The attempted inter-network communication may be an attempt by a device internal to the distributed network to communicate with an external resource. As another example, attempted inter-network communication may be an attempt by a device external to the distributed network to establish a VPN session with an internal network resource. In response to detecting an attempted inter-network communication, the device attempting to initiate such communication is identified at step 206. As previously described, the device may be internal or external to the distributed network.

After identifying the device attempting to initiate the inter-network communication, a determination is made at step 208 as to whether the identified device is associated with a registered protection agent 170. For example, protection agents 170 running on devices connected to the distributed network may be configured to generate and provide registration information to an IPS 165 (or other designated registration device) on a periodic basis. The IPS 165 (or other registration device) may store such registration information in a database or other suitable storage medium, and may later query that registration information to determine if a registered protection agent 170 is associated with the identified device. If the identified device is associated with a registered protection agent 170, a further determination may be made at step 210 as to whether the protection agent was registered within a specified time interval. In certain embodiments, the time interval may be specified by the network administrator. Such an optional further determination can be used to ensure that the registered protection agents 170 remains actively running on the device. If the protection agent is determined at step 210 to have been registered within a specified time interval, the exemplary method 200 advances to step 212, where the attempted inter-network communication is permitted.

If it is determined at step 208 that the identified device is not associated with a registered protection agent 170, or if it is determined at step 210 that the protection agent was not registered within the specified time interval, the exemplary method 200 moves to step 214, where the attempted inter-network communication is blocked. After blocking the attempted inter-network communication, the identified device is prompted at step 216 to install and/or activate a protection agent. From either step 216 or step 212, the exemplary method 200 returns to and is repeated from step 202, where communications to and from the distributed network are monitored.

Based on the foregoing, it can be seen that the present invention provides systems and methods for deploying protection agents to devices connected to a distributed network. Those skilled in the art will appreciate that the methods of the present invention can be embodied as computer-executable instructions stored on computer-readable media and can be implemented using programming techniques and/or functions other than those specifically described herein. Many other modifications, features and embodiments of the present invention will become evident to those of skill in the art. Furthermore, certain terminology used herein, such as the terms "network device," "inter-network communication," etc., was chosen for ease of reference and is used by way of general illustration and not limitation.

It should also be appreciated, therefore, that many aspects of the present invention were described above by way of example only and are not intended as required or essential elements of the invention unless explicitly stated otherwise. Accordingly, it should be understood that the foregoing relates only to certain exemplary embodiments of the invention and that numerous changes may be made thereto without departing from the spirit and scope of the invention as defined by the following claims. It should be further understood that the invention is not restricted to the illustrated embodiments and that various other modifications can be made within the scope of the following claims.

What is claimed is:

1. A system for intrusion protection, the system comprising:
    a central processing unit (CPU), a computer-readable memory, and a computer-readable storage device;
    first program instructions to receive from at least one of a client computing device and an external device of a distributed network at multiple successive times, re-registration information for a program agent installed on each of the client computing device and the external device to detect malicious intrusion, the re-registration information notifying a hardware or software intrusion protection device that the program agent is still installed on the client computing device and the external device respectively;
    second program instructions to subsequently detect inter-network communications, the inter-network communications including communications by the client computing device to a web server and communications to establish a virtual private network communication session by the external device of the distributed network with internal resources of the distributed network;
    third program instructions to identify a hardware or software device responsible for initiating the inter-network communications;
    fourth program instructions to determine, in response to detecting inter-network communications, whether the program agent to detect malicious intrusions is installed on the identified device and whether the identified device has re-registered the program agent within a predetermined time interval from a time of a request; and
    fifth program instructions to allow the inter-network communications if the identified device has re-registered the program agent within the predetermined time interval; and
    sixth program instructions to block the inter-network communications if the identified device has not re-registered the program agent within the predetermined time interval and if the program agent is not installed, the intrusion protection device delivers the program agent to detect malicious intrusions to the identified device for installation at the identified device without a request by the identified device to receive the program agent,
    wherein each of the program instructions are stored on the computer-readable storage device for execution by the CPU via the computer-readable memory.

2. The system of claim 1, wherein the intrusion protection device detects inter-network communications by the identified device by detecting network traffic employing HTTP (Hyper Text Transfer Protocol) or HTTPS (Hyper Text Transfer Protocol Secure) protocols generated by the identified device.

3. The system of claim 1, wherein the intrusion protection device detects inter-network communications by the identified device by detecting network traffic on one or more of network port 80 and network port 443 generated by the identified device.

4. The system of claim 1, further comprising:
    a communications hardware or software device for receiving re-registration information generated by program agents installed on a plurality of devices connected to the distributed network; and
    a storage medium for storing the re-registration information.

5. The system of claim 4, wherein the forth program instructions further comprise instructions to determine whether no information corresponding to the identified device has been stored in the storage medium.

6. A computer program product for intrusion detection, the computer program product embodied on a non-transitory computer-readable storage device having computer-readable program code stored thereon, the computer-readable program code comprising:
    computer-readable program code for receiving from at least one of a client computing device and an external device of a distributed network at multiple successive times, re-registration information for a program agent installed on each of the client computing device and the external device to detect malicious intrusion, the re-registration information notifying a hardware or software intrusion protection device that the program agent is still installed on the client computing device and the external device respectively;

computer-readable program code for subsequently detecting inter-network communications, the inter-network communications including communications by the client computing device to a web server and communications to establish a virtual private network communication session by the external device of the distributed network with internal resources of the distributed network;

computer-readable program code for identifying a device responsible for initiating the inter-network communications;

computer-readable program code for determining, in response to detecting inter-network communications, whether the program agent to detect malicious intrusions is installed on the identified device and whether the identified device has re-registered the program agent within a predetermined time interval from a time of request;

computer-readable program code for allowing the inter-network communications if the identified device has re-registered the program agent within the predetermined time interval; and computer-readable program code for blocking the inter-network communications if the identified device has not re-registered the program agent within the predetermined time interval and if the program agent is not installed, the intrusion protection device delivers the program agent to detect malicious intrusions to the identified device for installation at the identified device without a request by the identified device to receive the program agent.

7. The computer program product of claim 6, wherein the intrusion protection device periodically receives and stores re-registration information generated by program agents installed on the identified device.

8. The computer program product of claim 6, wherein the computer-readable program code for determining whether the program agent to detect malicious intrusions is installed further comprises program code for determining whether no information corresponding to the identified device has been stored.

9. The computer program product of claim 6, wherein the intrusion protection device detects inter-network communications by detecting identified devices employing HTTP (Hyper Text Transfer Protocol) or HTTPS (Hyper Text Transfer Protocol Secure) protocols.

10. The computer program product of claim 6, wherein the computer-readable program code for blocking the attempted inter-network communication comprises one of:

computer-readable program code for blocking network traffic between the client computing device and the web server, while permitting network traffic between the client computing device and another web server; and computer-readable program code for blocking the establishment of the virtual private network communication session with respect to at least a first activity, while permitting the establishment of the virtual private network communication session for at least a second activity.

* * * * *